United States Patent
Hsiao

(10) Patent No.: US 12,278,497 B2
(45) Date of Patent: Apr. 15, 2025

(54) WIRELESS CHARGING ASSEMBLY

(71) Applicants: Inventec (Pudong) Technology Corporation, Shanghai (CN); INVENTEC CORPORATION, Taipei (TW)

(72) Inventor: Chi-Cheng Hsiao, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 576 days.

(21) Appl. No.: 17/709,536

(22) Filed: Mar. 31, 2022

(65) Prior Publication Data

US 2023/0275462 A1    Aug. 31, 2023

(30) Foreign Application Priority Data

Feb. 25, 2022    (CN) .......................... 202210179560.2

(51) Int. Cl.
*H02J 50/00* (2016.01)
*H02J 7/00* (2006.01)
*H02J 50/10* (2016.01)
*H02J 50/40* (2016.01)
*H02J 50/80* (2016.01)

(52) U.S. Cl.
CPC .......... *H02J 50/005* (2020.01); *H02J 7/0042* (2013.01); *H02J 50/10* (2016.02); *H02J 50/402* (2020.01); *H02J 50/80* (2016.02)

(58) Field of Classification Search
CPC .......... H02J 50/10; H02J 50/80; H02J 50/005; H02J 50/402; H02J 7/0042
USPC ................................ 320/108, 114, 115, 134
See application file for complete search history.

(56) References Cited

U.S. PATENT DOCUMENTS

| | | | |
|---|---|---|---|
| 11,862,985 B2* | 1/2024 | Louis ...................... | H02J 50/10 |
| 2015/0002091 A1* | 1/2015 | Nakayama ............ | H02J 7/0042 |
| | | | 320/108 |
| 2017/0093198 A1* | 3/2017 | Graham ................ | H02J 7/0042 |
| 2018/0375378 A1* | 12/2018 | Hidaka ................. | H02J 50/005 |
| 2021/0099027 A1* | 4/2021 | Larsson ................ | H02J 50/80 |
| 2021/0099031 A1* | 4/2021 | Jol .......................... | H02J 50/10 |
| 2021/0210985 A1* | 7/2021 | Shostak ................. | H02J 50/90 |
| 2022/0094202 A1* | 3/2022 | Karanikos .............. | H02J 50/10 |

* cited by examiner

*Primary Examiner* — Edward Tso
*Assistant Examiner* — Aaron Piggush
(74) *Attorney, Agent, or Firm* — Troutman Pepper Locke LLP; Tim Tingkang Xia, Esq.

(57) ABSTRACT

A wireless charging assembly including a base body, a charging coil, a magnet and a plurality of partitions. The charging coil is disposed in the base body. The magnet includes a body part and a plurality of protruding parts. The plurality of protruding parts protrude from a side of the body part. The body part and the plurality of protruding parts are integrally formed as a single piece. The body part is disposed in the base body. The plurality of partitions are connected to the base body. The plurality of protruding parts of the magnet are spaced apart from each other by the plurality of partitions.

7 Claims, 3 Drawing Sheets

WIRELESS CHARGING ASSEMBLY

CROSS-REFERENCE TO RELATED APPLICATIONS

This non-provisional application claims priority under 35 U.S.C. § 119(a) on Patent Application No(s). 202210179560.2 filed in China, on Feb. 25, 2022, the entire contents of which are hereby incorporated by reference.

BACKGROUND OF THE INVENTION

Technical Field of the Invention

The invention relates to a charging assembly, more particularly to a wireless charging assembly.

Description of the Related Art

Recently, in order to allow smartphones to be charged in a convenient manner, various kinds of wireless charging assembly have been developed for charging smartphones without being limited by physical cables. Also, since the smartphone and a charging coil of the wireless charging assembly should be aligned to maintain the charging efficiency, magnets are usually disposed in a base body of the wireless charging assembly. The magnets are separated from one another and are arranged along the circumferential direction of the base body so as to attract the smartphone, thereby aligning the smartphone with the charging coil.

However, it is inconvenient to install such separated magnets on the base body or remove such separated magnets from the base body. In detail, in order to install the separated magnets on the base body, a dispensing process should be individually performed on the separated magnets. Thus, in order to install all of the magnets on the base body, the dispensing process is performed several times and the curing of an adhesive may cost a lot of time. On the other hand, when the wireless charging assembly is required to be reworked, the magnets are required to be removed from the base body. Since the magnet are separated from each other, the adhering between each magnet and the base body is required to be destroyed to remove all of the magnets from the base body one by one.

SUMMARY OF THE INVENTION

The invention is to provide a wireless charging assembly whose magnet includes a body part and a plurality of protruding parts that are integrally formed as a single piece, thereby allowing the magnet to be installed on or removed from the base body in a convenient manner.

One embodiment of this invention provides a wireless charging assembly including a base body, a charging coil, a magnet and a plurality of partitions. The charging coil is disposed in the base body. The magnet includes a body part and a plurality of protruding parts. The plurality of protruding parts protrude from a side of the body part. The body part and the plurality of protruding parts are integrally formed as a single piece. The body part is disposed in the base body. The plurality of partitions are connected to the base body. The plurality of protruding parts of the magnet are spaced apart from each other by the plurality of partitions.

According to the wireless charging assembly disclosed by above embodiment, since the body part and the protruding parts of the magnet are integrally formed as a single piece, the protruding parts are fixed to the body part. Thus, there is no need to individually deal with the protruding parts when installing the magnet on the base body or removing the magnet from the base body, which allows the magnet to be installed on or removed from the base body in a convenient manner.

Further, since the protruding parts of the magnet are spaced apart from each other by the partitions, magnet fields created by the separated protruding parts are prevented from interfering with each other. Accordingly, the protruding parts can firmly attract the electronic device such as a smartphone.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
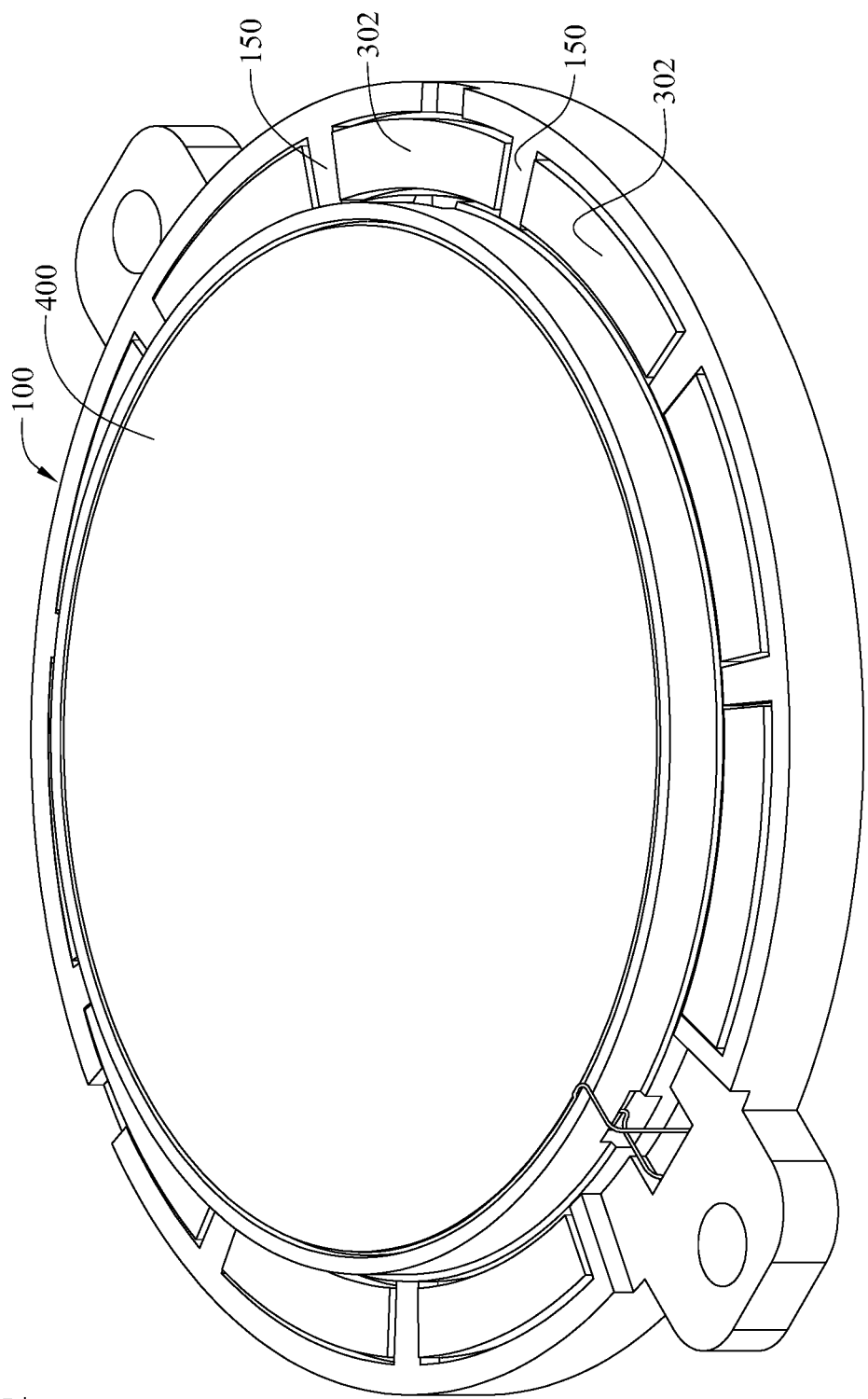
FIG. 1 is perspective view of a wireless charging assembly according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
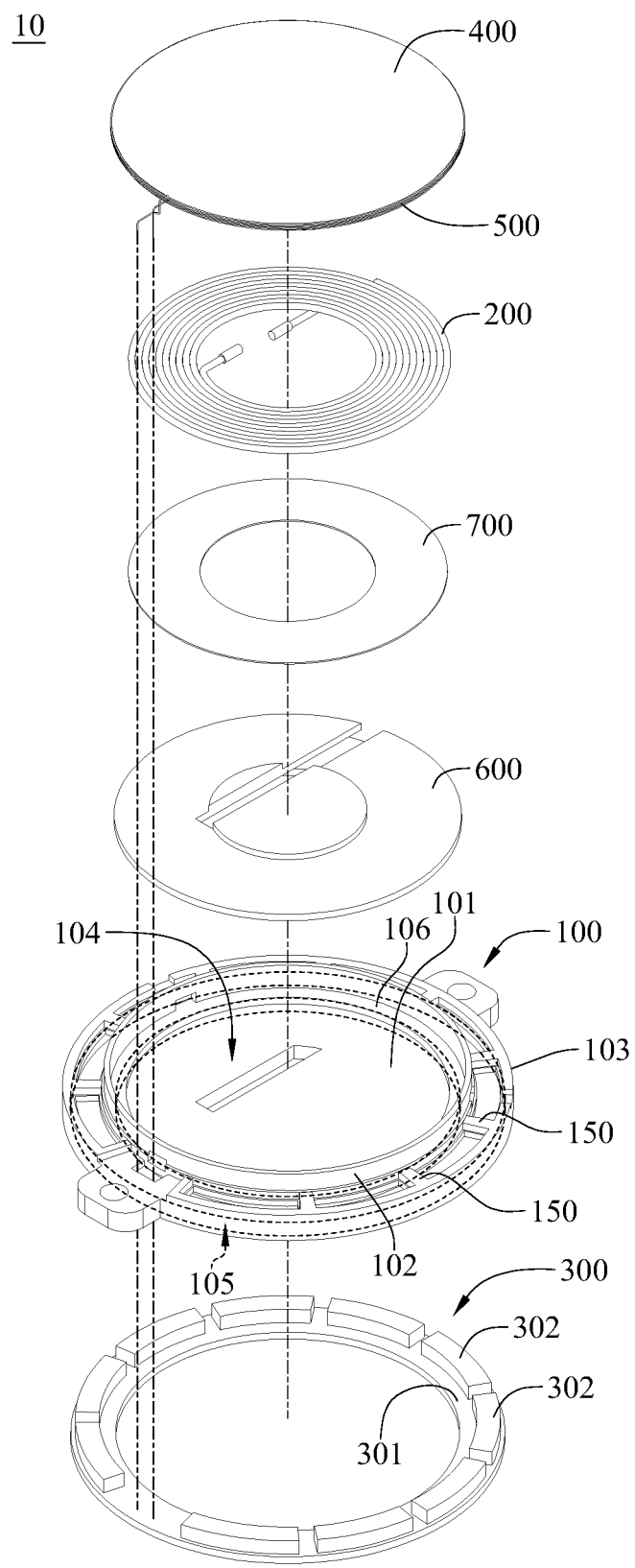
FIG. 2 is a perspective exploded view of the wireless charging assembly in FIG. 1.
Figure 3:
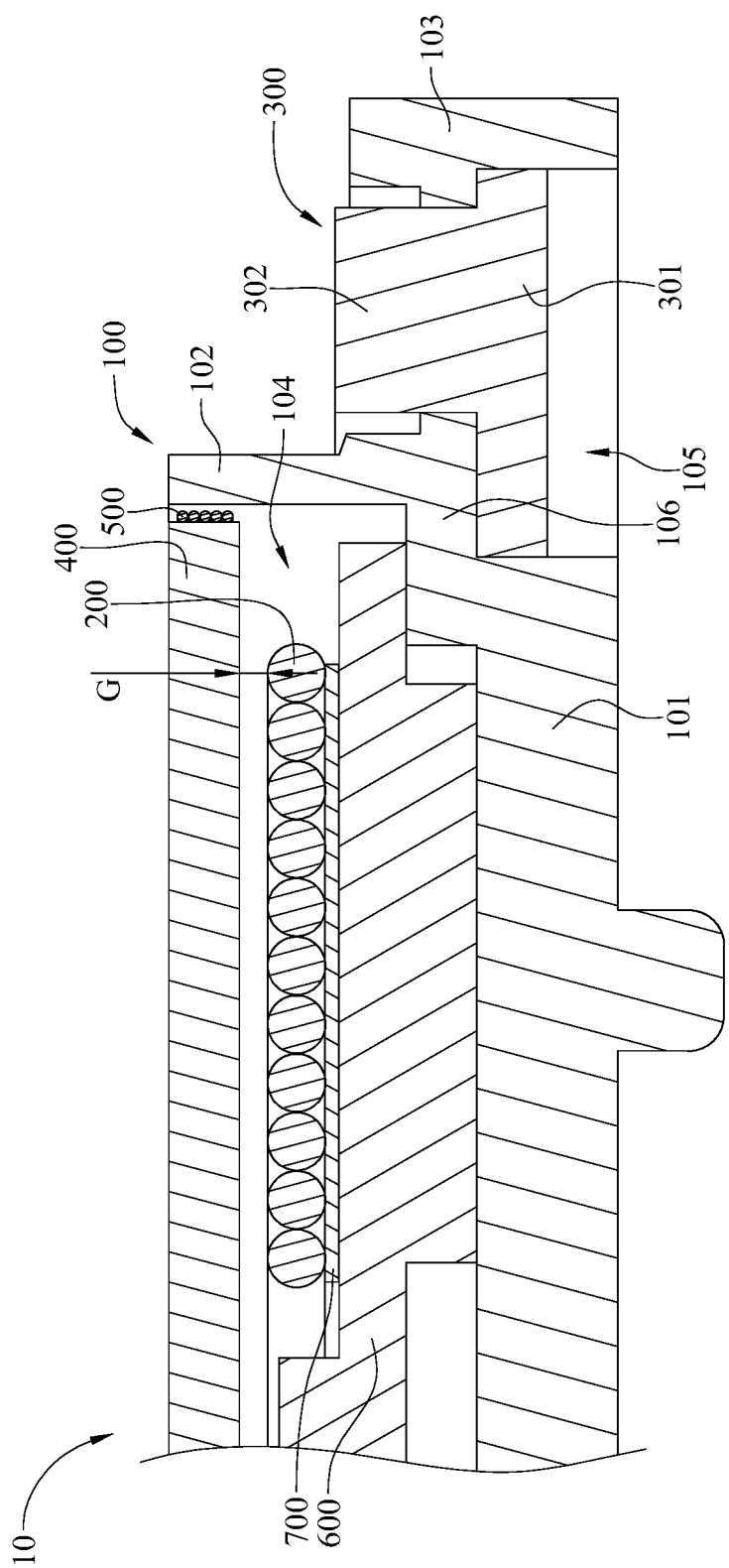
FIG. 3 is a partially enlarged cross-sectional view of the wireless charging assembly in FIG. 1.

Please refer to FIGS. 1 to 3, where FIG. 1 is perspective view of a wireless charging assembly 10 according to an embodiment of the invention, FIG. 2 is a perspective exploded view of the wireless charging assembly 10 in FIG. 1, and FIG. 3 is a partially enlarged cross-sectional view of the wireless charging assembly 10 in FIG. 1.

In this embodiment, the wireless charging assembly 10 includes a base body 100, a plurality of partitions 150, a charging coil 200 and a magnet 300. The wireless charging assembly 10 is configured to charge an electronic device (not shown) such as a smartphone.

In this embodiment, the base body 100 includes a bottom plate 101, an inner annular plate 102 and an outer annular plate 103. The inner annular plate 102 stands on the bottom plate 101 so as to form a first accommodation space 104 together with the bottom plate 101. The partitions 150 radially protrude from the inner annular plate 102 along a direction away from the first accommodation space 104. Also, in this embodiment, the partitions 150 and the base body 100 are, for example, integrally formed as a single piece. The outer annular plate 103 is connected to sides of the partitions 150 located farthest away from the inner annular plate 102 so as to form a second accommodation space 105 together with the inner annular plate 102. The second accommodation space 105 surrounds the first accommodation space 104. The partitions 150 are located in the second accommodation space 105. Note that in this embodiment, the base body 100 further includes a connection plate 106. The inner annular plate 102 is connected to the bottom plate 101 via the connection plate 106. For example, the connection plate 106 is parallel to the bottom plate 101 and is perpendicular to the inner annular plate 102.

The charging coil 200 is disposed in the first accommodation space 104 of the base body 100 and is configured to charge the electronic device.

The magnet 300 includes a body part 301 and a plurality of protruding parts 302. The protruding parts 302 protrude from the same side of the body part 301 and are configured to attract the electronic device. The body part 301 and the protruding parts 302 are integrally formed as a single piece. The body part 301 and the protruding parts 302 are disposed in the second accommodation space 105 of the base body 100. The protruding parts 302 of the magnet 300 are spaced apart from one another by the partitions 150 within the second accommodation space 105. Note that in this invention, since the body part 301 and the protruding parts 302 are parts of the magnet 300, the body part 301 and the protruding parts 302 exhibit properties of magnetism.

In this embodiment, as shown in FIG. 3, the charging coil 200 and the magnet 300 are spaced apart from each other by a part of the base body 100. Specifically, in this embodiment, the inner annular plate 102 is located between the charging coil 200 and the protruding parts 302 of the magnet 300 so as to space the charging coil 200 and the magnet 300 apart from each other. Accordingly, the inner annular plate 102 prevents the operation of the charging coil 200 and the operation of the magnet 300 from interfering with each other. Note that in other embodiment, the charging coil and the magnet may not be spaced apart from each other by a part of the base body (i.e., the inner annular plate) and may be spaced apart from each other merely by an air gap.

In this embodiment, the wireless charging assembly 10 further includes a circuit board 400 and a near field communication (NFC) coil 500. The near field communication coil 500 is disposed on the circuit board 400 and is configured to communicate with the electronic device via near field communication technology. The circuit board 400 is disposed in the first accommodation space 104 of the base body 100, and the near field communication coil 500 is located in the first accommodation space 104. Note that since the second accommodation space 105 surrounds the first accommodation space 104, the magnet 300 located in the second accommodation space 105 surrounds the circuit board 400. Further, a center of the circuit board 400 is aligned with a center of the base body 100, which facilitates the near field communication coil 500 disposed on the circuit board 400 to receive signals transferred from the electronic device based on the induction between the near field communication coil 500 and the electronic device. In addition, since the near field communication coil 500 is disposed on the circuit board 400, the near field communication coil 500 can be disposed on the circuit board 400 via etching or adhering instead of being wound on an annular bracket, which simplifies the assembly of the near field communication coil 500.

In this embodiment, the circuit board 400 is, for example, a flexible circuit board, but the invention is not limited thereto. In other embodiments, the circuit board may be a rigid circuit board.

In this embodiment, the charging coil 200 and the near field communication coil 500 are coaxial, such that the space utilization of the first accommodation space 104 is improved. In other embodiments, as long as the near field communication coil according to this invention have larger induction range comparing to the near field communication coil disposed on the annular bracket, the charging coil and the near field communication coil may not be coaxial.

In this embodiment, as shown in FIG. 3, the circuit board 400 and the charging coil 200 are spaced apart from each other by a gap G so as to prevent the operation of the circuit board 400 and the operation of the charging coil 200 from interfering with each other. In this embodiment, a size of the gap G is, for example, 0.4 millimeter (mm). Note that in other embodiments, the circuit board and the charging coil may be in contact with each other.

In this embodiment, as shown in FIG. 3, the charging coil 200 is located between the circuit board 400 and the bottom plate 101, but the invention is not limited thereto. In other embodiments, the charging coil may be located on a side of the circuit board that is located farthest from the bottom plate.

In this embodiment, the wireless charging assembly 10 further comprises a magnetic substrate 600 and an adhesive 700. The magnetic substrate 600 is accommodated in the first accommodation space 104, and is located between the bottom plate 101 and the charging coil 200. In addition, the magnetic substrate 600 is made of ferrite. The adhesive 700 is accommodated in the first accommodation space 104, and is located between the magnetic substrate 600 and the charging coil 200. The charging coil 200 is fixed to the magnetic substrate 600 via the adhesive 700. In other embodiments, the wireless charging assembly may not include the magnetic substrate 600 and the adhesive 700.

Additionally, in other embodiments, the second accommodation space may not surround the first accommodation space but may be located on a side of the first accommodation space. In other embodiments, the wireless charging assembly may not include the circuit board 400 and the near field communication coil 500.

According to the wireless charging assembly disclosed by above embodiments, since the body part and the protruding parts of the magnet are integrally formed as a single piece, the protruding parts are fixed to the body part. Thus, there is no need to individually deal with the protruding parts when installing the magnet on the base body or removing the magnet from the base body, which allows the magnet to be installed on or removed from the base body in a convenient manner.

Further, since the protruding parts of the magnet are spaced apart from each other by the partitions, magnet fields created by the separated protruding parts are prevented from interfering with each other. Accordingly, the protruding parts can firmly attract the electronic device such as a smartphone.

In an embodiment of the invention, the wireless charging assembly according to the invention are of automotive grade and can be applied to an automotive device such as an autonomous vehicle, electric vehicle or semi-autonomous vehicle.

Further, the wireless charging assembly according to the invention integrates the wireless charging technology and the near field communication technology, to realize the application having high demand for data security by utilizing the near field communication technology to perform verification, simple pairing, signal transmission or the like.

The wireless charging assembly according to the invention can be regarded as a module, and the wireless charging assembly according to the invention is not limited to be applied to portable devices, but can also be applied to automotive devices.

The circuit board according to the invention where the near field communication coil is disposed is of automotive grade, such that the wireless charging assembly according to the invention can be applied in the wireless charger disposed in the electric vehicle.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A wireless charging assembly, comprising:
a base body, comprising a bottom plate, an inner annular plate and an outer annular plate, wherein the inner annular plate stands on the bottom plate so as to form a first accommodation space together with the bottom plate;
a charging coil, disposed in the first accommodation space of the base body;
a magnet, comprising a body part and a plurality of protruding parts, wherein the plurality of protruding parts protrude from a side of the body part, the body part and the plurality of protruding parts are integrally formed as a single piece, and the body part is disposed in the base body;
a plurality of partitions, connected to the base body, wherein the plurality of protruding parts of the magnet are spaced apart from each other by the plurality of partitions, the plurality of partitions protrude from the inner annular plate along a direction away from the first accommodation space, the outer annular plate is connected to sides of the plurality of partitions located farthest from the inner annular plate so as to form a second accommodation space together with the inner annular plate, the second accommodation space surrounds the first accommodation space, and the magnet and the plurality of partitions are located in the second accommodation space;
a circuit board, disposed in the first accommodation space so that the magnet surrounds the circuit board; and
a near field communication (NFC) coil, disposed on the circuit board.

2. The wireless charging assembly according to claim 1, wherein the charging coil and the magnet are spaced apart from each other by a part of the base body.

3. The wireless charging assembly according to claim 1, wherein the circuit board is a flexible circuit board.

4. The wireless charging assembly according to claim 1, wherein the charging coil and the near field communication coil are coaxial.

5. The wireless charging assembly according to claim 1, wherein the circuit board and the charging coil are spaced apart from each other by a gap.

6. The wireless charging assembly according to claim 1, wherein the charging coil is located between the circuit board and the bottom plate.

7. The wireless charging assembly according to claim 1, further comprising a magnetic substrate, wherein the magnetic substrate is accommodated in the first accommodation space, and the magnetic substrate is located between the bottom plate and the charging coil.

* * * * *